UNITED STATES PATENT OFFICE.

WILLIAM M. BROWNELL, OF BROOKLYN, NEW YORK, ASSIGNOR OF THREE-FOURTHS TO ARTHUR N. HOOD, OF NEWTON, MASSACHUSETTS, AND JOHN T. NIGHTINGALE, OF BOSTON, MASSACHUSETTS.

PROCESS OF DRYING CASEIN.

1,239,766.      Specification of Letters Patent.      Patented Sept. 11, 1917.

No Drawing.      Application filed May 1, 1916. Serial No. 94,585.

*To all whom it may concern:*

Be it known that I, WILLIAM M. BROWNELL, a citizen of the United States, residing at the borough of Brooklyn, county of Kings, State of New York, have invented a certain new and useful Improvement in Processes of Drying Casein, of which the following is a specification.

My invention has for its object a new and improved process of drying casein by which a light-colored casein of low acidity may be produced thereby rendering it suitable for use under the most exacting conditions. Heretofore, in the manufacture of casein, it has been customary to take the curd, whether made from skim milk or buttermilk, after the curd has been washed and the whey drawn off, and press it as dry as possible, and then to break up these cakes into particles ranging in size from dust to that of peas. This irregularly ground semi-wet material, which contains from 50 to 70% of moisture, is spread in trays and put into a suitable drying oven. The temperature of this oven must be regulated so that it will not overheat or burn the dust like particles, and will eventually dry the larger pieces. The result of this process has been that the dust dries almost immediately while the larger particles dry so slowly that fermentation takes place in them, developing bacteria, which produces various organic acids such as lactic, butyric, etc. This increases greatly the acidity of the casein and also tends to discolor it so that the final product is a brownish white, instead of a cream white. The high acidity of the final product is objectionable because of the amount of alkali necessary to be used to neutralize the acid which results in the formation of large quantities of insoluble salts which reduce the adhesiveness of the final product. Accordingly if such casein is used for paper coating it will be found that the coating is dark in color, does not adhere well to the paper and tends to flake or pick.

The process embodying my invention affords means by which the casein may be dried rapidly and uniformly without the formation of organic acids and the consequent increase of acidity of the final product. It also produces a casein which is of very light color and therefore suitable for use for the most exacting purposes, as for instance in the coating of fine white papers. Since it has little or no acidity the resulting product is capable of use with small amounts of alkali and produces a paper coating which is very tenacious and smooth and does not flake or pick.

In practising the method embodying my invention I proceed as follows: I take the curd or casein after the whey has been drawn off, and heat it, preferably in hot water, at a temperature of from 135 to 180° Fahrenheit. This temperature softens the casein and renders it of a plastic doughy gelatinous consistency, in which condition it can be readily worked and kneaded. At this time, it is exceedingly sticky and tenacious. The casein, in this condition, is then worked or kneaded to render it entirely homogeneous. This doughy or plastic mass of casein is then shaped into suitable form, as for instance into strings, ribbons or tubes. This is done conveniently by forcing it by a propelling worm or screw through a suitable die or nozzle from which it emerges in a continuous strip or ribbon. This strip or ribbon is then immersed in water which is of a temperature lower than the casein. The water may be either cool or tepid. On being removed from the water it will be found that the surface of the casein has ceased to be tenacious or sticky and that the ribbons or strips will not adhere to each other if they are accidentally brought into contact with each other.

Having been formed into ribbons, strips or pieces of convenient shape and size, and immersed in water to render the surface non-adhesive, the material is dried. One convenient method is to hang up the ribbons in some place where they will be subjected to the action of a current of dry air. This can be done in the open air or in a suitable drying chamber. Another convenient method is to cut up the ribbons or strips into small pieces of uniform size which may be poured into a rotary drier in which they are submitted to the passage of a current of dry heated air while being gently agitated. In practising my invention in its preferred form I work and knead the wet curd or casein until it is exactly homogeneous, the object being to distribute the moisture uniformly throughout the mass so that every unit of the mass will contain an equal amount of moisture. I also cut the strips or ribbons into small pieces of uniform size and diameter so that when the pieces are passed through the drier each piece will give off an equal amount of moisture in a given time. In this way the pieces can be passed through a traveling drier, heated to the proper temperature and will emerge in uniform condition.

I find that when thus treated the casein is rendered non-adhesive, and the drying will take place rapidly and uniformly. If desired a small quantity of some suitable antiseptic may be placed in the bath of water in which the ribbons are immersed, so that the ribbons may then be cured by being hung in the open air, the growth of mold on the surface being prevented by the presence of the antiseptic. The herein described process is particularly adapted for use by small creameries, and on farms which do not have the expensive driers and other machinery necessary to produce dry casein by the methods heretofore commonly used.

The process embodying my present invention is particularly adapted for use in connection with rennet casein, because rennet casein is very sticky and tenacious and great difficulty has been experienced in drying it. It is also applicable for use in connection with casein which has been precipitated by the use of sulfuric acid and which after the whey has been drawn off is granular in form and does not readily adhere. In case of casein which has been precipitated by the use of sulfuric acid, the heating softens or partly melts the granules and the kneading renders the mass homogeneous so that the process can be proceeded with exactly as described previously.

What I claim is—

1. The method of drying casein which consists in submitting the curds or wet casein to heat to render them plastic, sticky and homogeneous, forming the material into small pieces, immersing it in water to render the surface non-adhesive, and drying the material.

2. The method of drying casein which consists in submitting the curds or wet casein to a temperature of from 135 to 180° Fahrenheit, to render them plastic, sticky and homogeneous, forming the material into small pieces, immersing it in water of a temperature lower than that to which the material has been heated to render the surface non-adhesive, and drying the material.

3. The method of drying casein which consists in subjecting the wet curds or casein to heat to render them plastic, sticky and homogeneous, forming the material into continuous strips or ribbons, immersing the material in water to render the surface non-adhesive, cutting the strips into smaller pieces, and drying the same while being agitated.

4. The method of drying casein which consists in submitting the curds of wet casein to heat to render them plastic, sticky and homogeneous and to distribute the moisture uniformly throughout the mass, forming the material in pieces of uniform size, immersing it in water to render the surface non-adhesive and drying the material.

In testimony whereof I affix my signature, in presence of two witnesses.

WILLIAM M. BROWNELL.

Witnesses:
H. ALBERTUS WEST,
W. L. COVERT.